United States Patent
Cowdrick

[19]
[11] Patent Number: 6,094,157
[45] Date of Patent: Jul. 25, 2000

[54] OBLIQUE SCANNING GROUND PENETRATING RADAR

[75] Inventor: Dennis H. Cowdrick, Maitland, Fla.

[73] Assignee: Underground Imaging, Inc., White Bear Lake, Minn.

[21] Appl. No.: 09/202,121

[22] PCT Filed: Sep. 2, 1997

[86] PCT No.: PCT/US97/15338

§ 371 Date: Mar. 3, 1999

§ 102(e) Date: Mar. 3, 1999

[87] PCT Pub. No.: WO98/10310

PCT Pub. Date: Mar. 12, 1998

Related U.S. Application Data

[60] Provisional application No. 60/025,575, Sep. 6, 1996.

[51] Int. Cl.[7] .................. G01V 3/00; G01S 13/88
[52] U.S. Cl. .................. 342/22; 342/129; 342/191
[58] Field of Search ................. 342/22, 126, 127, 342/128, 129, 135, 179, 180, 191, 197

[56] References Cited

U.S. PATENT DOCUMENTS

| | | | |
|---|---|---|---|
| 3,719,947 | 3/1973 | Gutton et al. | 343/112 R |
| 3,745,575 | 7/1973 | Kikuchi | 343/12 R |
| 3,806,863 | 4/1974 | Tilley et al. | 367/21 |
| 4,331,957 | 5/1982 | Enander et al. | 343/6.8 R |
| 4,410,237 | 10/1983 | Veldkamp | 350/320 |
| 4,905,008 | 2/1990 | Kawano et al. | 342/22 |
| 5,017,923 | 5/1991 | Nemit | 342/52 |
| 5,327,139 | 7/1994 | Johnson | 342/22 |
| 5,357,063 | 10/1994 | House et al. | 181/108 |
| 5,357,253 | 10/1994 | Van Etten et al. | 342/22 |
| 5,400,030 | 3/1995 | Duren et al. | 342/22 |
| 5,444,441 | 8/1995 | Sutton | 340/850 |
| 5,486,833 | 1/1996 | Barrett | 342/204 |
| 5,502,444 | 3/1996 | Kohlberg | 342/22 |
| 5,631,658 | 5/1997 | Gudat et al. | 342/457 |
| 5,673,050 | 9/1997 | Moussally et al. | 342/22 |
| 5,720,354 | 2/1998 | Stump et al. | 175/26 |
| 5,904,210 | 5/1999 | Stump et al. | 175/45 |
| 5,942,899 | 8/1999 | Shrekenhamer et al. | 324/326 |

FOREIGN PATENT DOCUMENTS 408271642A 10/1996 Japan .................. G01V 3/12

OTHER PUBLICATIONS

"Ray decomposition of the pulse responses of a two-layer half-space", Nabulsi, K.A.; Wait, J.R., Geoscience and Remote Sensing, IEEE Transactions on vol. 35 2, Mar. 1997, pp. 287–292.

"Simulation of close-in and stand-off mine detection", Trang, A.H.; Irion, H.G., Jr., Geoscience and Remote Sensing, 1997. IGARSS '97. Remote Sensing—A Scientific Vision for Substainable Development., 1997 IEEE International, vol. 3, 1997, Page(s):.

"Radar contrast polarization dependence on subsurface sensing", Fuks, I.M., Geoscience and Remote Sensing Symposium Proceedings, 1998. IGARSS '98. 1998 International, vol. 3, 1998, pp. 1455–1459 vol. 3.

"Exploration of innovative radar sensing schemes for subsurface object detection", O'Neill, K., Geoscience and Remote Sensing, 1997. IGARSS '97. Remote Sensing—A Scientific Vision for Substainable Development., 1997 IEEE International, vol. 3, 1997.

International Search Report dated Jan. 30, 1998 in PCT Appln. No. PCT/US97/15338.

*Primary Examiner*—John B. Sotomayor
*Attorney, Agent, or Firm*—Quarles & Brady

[57] ABSTRACT

A ground penetrating radar uses an oblique or grazing angled radiation beam to provide improved coupling of radar energy into the earth reducing forward and back scatter and eliminating the need to traverse the surface of the earth directly over the investigated volume.

8 Claims, 3 Drawing Sheets

OBLIQUE SCANNING GROUND PENETRATING RADAR

This application is a national stage of PCT/US97/15338, filed Sep. 2, 1997. This application claims benefit of provisional application Ser. No. 60/025,575, filed Sep. 6, 1996.

BACKGROUND OF THE INVENTION

Ground penetrating radar is known for use in detecting underground structure such as pipes or the like. In such systems, microwave frequency radio (radar) signals are transmitted into the earth, and echoes off sub-surface structures are detected and displayed.

In order to increase the signal strength of the returning echo, the microwave transmitting antenna is typically placed close to the surface of the earth to direct energy directly downward. The antenna may be attached to the back of a truck that is driven over the surface of the site to be investigated. Multiple readings or a continuous band of readings may be obtained and a plot produced in which movement of the antenna is plotted in the x-axis and the echo signal is plotted in the y-axis. Stronger echo signals are represented by a darker shading so that a pipe or similar echo producing structure may be identified.

The images produced by these techniques can be of low quality because of the difficulty of coupling adequate radar energy into the earth. The need to move the antenna over the surface of the earth is cumbersome and in many important applications may be difficult or impossible.

SUMMARY OF THE INVENTION

The present invention provides a ground penetrating radar system in which the radar signal is directed at an acute angle with respect to the surface of the earth. In particular, the angle chosen is a Brewster angle at which a parallel polarized radar signal is almost completely coupled into the earth. The acute angle of the radar beam allows scanning of a sub-surface volume eliminating the need to traverse the ground over the volume to be investigated.

More specifically, the present invention provides a ground penetrating radar having a radar transmitter providing a microwave electrical signal that is coupled to a radar antenna transmitting the radar signal along a primary transmission axis at which greatest power is emitted. An antenna head supports the radar antenna with respect to the surface of the earth so that the radar antenna's primary transmission axis intersects the surface of the earth at a Brewster angle, the Brewster angle being a function of the dielectric constant of the earth. A radar receiver receives reflected radar signals from the radar antenna. An electronic computer processes the received radar signals to output an indication of materials beneath the surface of the earth.

The Brewster angle will typically be an angle from ten to thirty-five degrees and the radar antenna will impart a parallel polarization to the transmitted radar signal.

Thus, it is one object of the invention to provide an improved coupling of radar energy into the earth for the purpose of ground penetrating radar measurements. Although intuitively one might expect grazing angles to increase the reflection the radar signal off the earth's surface, for a properly polarized radar signal at the Brewster angle, more energy is coupled into the earth than is coupled into the earth at an angle normal to the earth's surface as is traditionally used.

Better coupling increases the usable energy of the radar signal by: 1) reducing back-scatter from the surface of the earth (such as may mask the echo signals), and 2) reducing forward scatter from uncoupled energy that may reflect from other objects and cause interference with the coupled energy path.

The antenna head may include a raster carriage moving the antenna head to a plurality of points over a surface extending across the primary transmission axis.

Thus, it is yet another object of the invention to allow scanning of a sub-surface volume without the need to move an antenna closely over the surface of the volume being investigated. The grazing angle of orientation of the radar signal allows scanning in an essentially vertical plane from a single position to the side of the investigated volume. This can be important when the surface over the investigated volume is not readily accessible or is hazardous. The low grazing angle of the scanning allows a limited vertical raster scan to provide a relatively larger coverage of scanning area 26 above the investigated volume 12.

The surface traversed by the raster carriage may be a plane.

It is another object of the invention to provide for a simple raster carriage design. A planar raster scan may be readily implemented with conventional mechanical elements.

The received radar signals may indicate time delays in echoes from materials beneath the surface of the earth, and the computer may operate according to a stored program to shift the radar signals with respect to each other to simulate the reception of radar signals at a curved surface focused on individual points beneath of the surface of the earth. The curved surface may be one where radar signals take equal time to travel from a given point of focus beneath the surface of the earth to all points on the curved surface.

Thus, it is another object of the invention to adapt synthetic aperture techniques to the unique refractive environment of an oblique ground penetrating radar by accommodating for refractive effects in the generation of the synthetic aperture.

The computer may execute a stored program to produce a three dimensional representation of material beneath the surface of the earth.

It is yet a further object of the invention to apply three dimensional imaging techniques to the data obtained in an oblique ground penetrating radar design.

The foregoing and other objects and advantages of the invention will appear from the following description. In the description, reference is made to the accompanying drawings which form a part hereof and in which there is shown by way of illustration a preferred embodiment of the invention. Such embodiment does not necessarily represent the full scope of the invention, however, and reference must be made therefore to the claims herein for interpreting the scope of the invention.

DETAILED DESCRIPTION OF THE INVENTION

Figure 1:
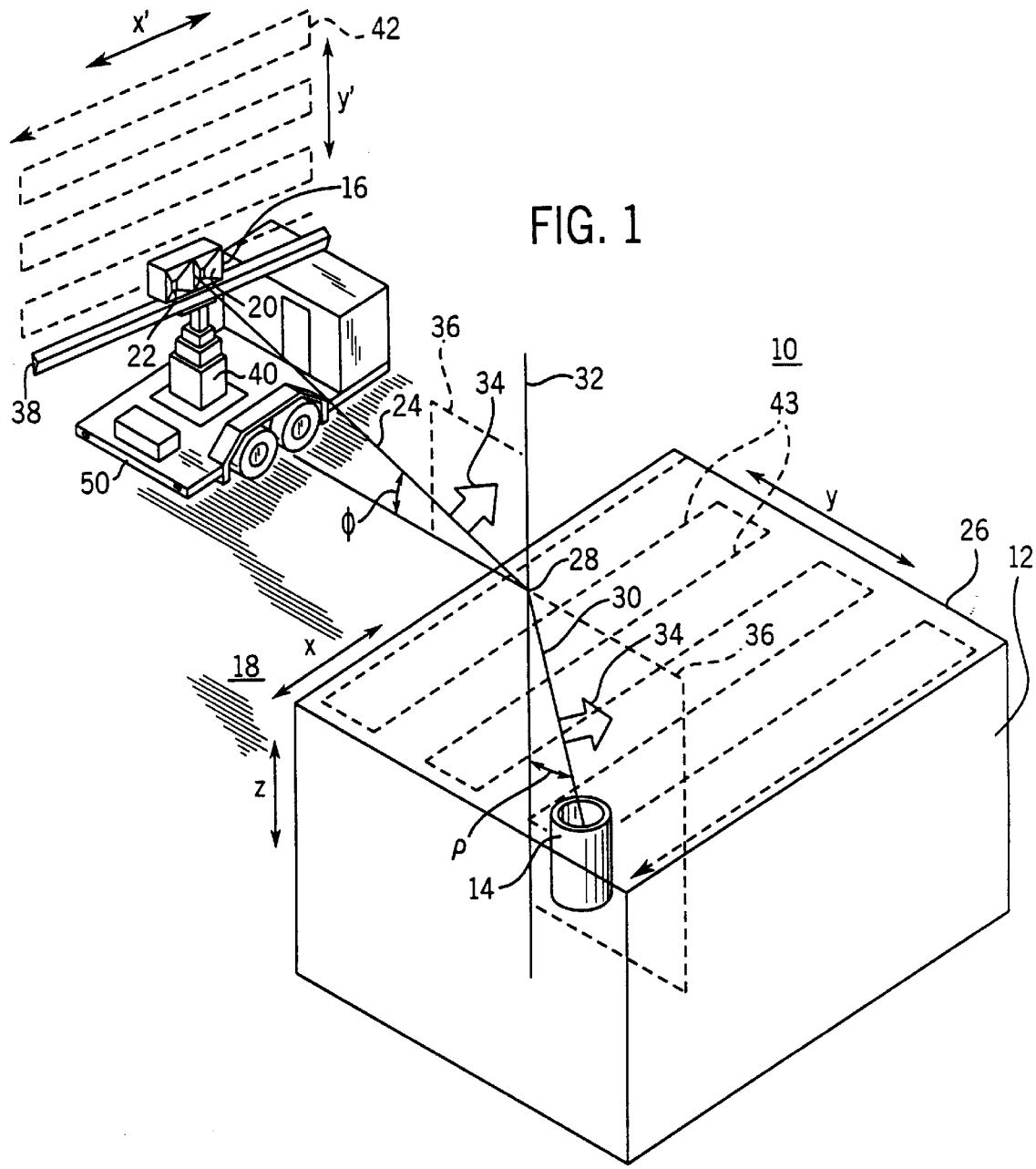
FIG. 1 is a perspective view of an investigation site showing a sub-surface volume and a vertically extending raster carriage holding a radar antenna head for movement thereon to direct a radar beam at a grazing Brewster angle at the surface of the sub-surface volume.

Referring now to FIG. 1, an investigation site 10 includes a sub-surface volume 12 to be investigated having a buried structure 14 such as a pipe. The buried structure could equally be any discontinuity in the dielectric properties of the earth, including abrupt moisture and density changes, underground pollution plumes and sub-surface air pockets.

An antenna head 16 is located to the side of the sub-surface volume 12 above the surface of the earth 18 and includes a transmitting antenna 20 and receiving antenna 22. Both antennas are directed along an air path 24 toward a surface point 28 on a scanning area 26 above the sub-surface volume 12.

The scanning area 26, at its edges generally aligned along the air path 24, defines a y-axis of a Cartesian coordinate system. Second edges of the scanning area 26 crossing the air path 24 defining an x-axis of the Cartesian coordinate system. A z-axis of the Cartesian coordinate system corresponds generally to a depth within the sub-surface volume 12.

The air path 24 intersects the surface point 28 at an angle $\phi$ with respect to the surface of the earth 18. Angle $\phi$ is a grazing or acute angle selected to provide a maximum coupling of a radar signal directed along air path 24 into the sub-surface volume 12 as will be described.

The transmitting antenna 20 provides a parallel polarization to the radar signal passing along path 24. As mentioned, parallel polarization means that the electric vector 34 of the radar signal lies within the plane of incidence 36 including the air path 24 and a vertical axis 32 normal to the surface of the earth 18.

Electromagnetic radiation directed along path 24 and striking surface point 28 is refracted into the sub-surface volume 12 along earth path 30. Earth path 30 also lies in the plane of incidence 36 and has an electric vector 34 lying within the plane of incidence 36. Earth path 30 deviates from the vertical axis 32 by an angle $\rho$.

The antenna head 16 is mounted on a horizontal boom 38 defining an x'-axis generally parallel to the x-axis. The boom extends approximately twenty feet and is initially positioned approximately eighteen feet above the surface of the earth 18. The boom 38 may be moved in a y'-axis, between its initial altitude and a higher altitude by means of a center telescoping tower 40 having its lower end attached to a base such as a trailer bed 50 or the like. The telescoping tower 40 is extendible by means of motor driven lead screws (not shown) and may be tipped left and right, forward and backwards and rotated about a vertical axis by secondary lead screws (also not shown) in order to properly align the boom 38 with the scanning area 26 and to adjust the angle $\phi$ of the path 24.

The telescoping tower 40 may be extended approximately twelve feet in the y'-direction to cause the antenna head 16 to rise. This in turn moves surface point 28 outward in the y-direction. The antenna head 16 may also slide back and forth in the x'-direction across the boom 38 drawn by a cable and pulley assembly (not shown). These movements combine so as allow a scanning of the surface point 28 in the x and y directions. In this way, the surface point 28 may be scanned over the scanning area 26 in a raster 43.

During a measurement of the sub-surface volume, the boom 38 incremented through elevations and the antenna head 16 is moved along the boom 38 at each elevation so as to scan a raster pattern 42 in axes x' and y' causing, in turn, surface point 28 to scan a similar raster pattern 43 but in axes x and y.

As a result of angle $\phi$ between the air path 24 and the surface of the earth 18 being smaller than forty-five degrees, the separation between horizontal rows of the raster pattern 42 in y' will be less than the separation horizontal rows of the raster pattern 43 in y in scanning area 26. Thus, the vertical mechanical motion required of the antenna head 16 may be limited and still provide substantial coverage over the scanning area 26.

Figure 2:
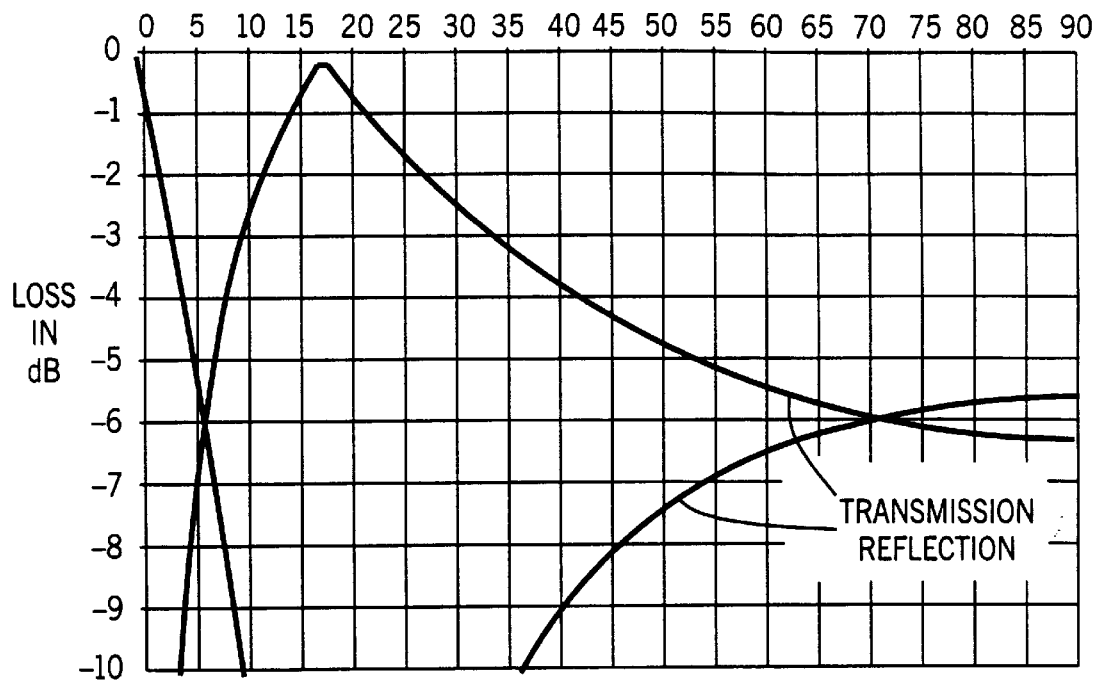
FIG. 2 is a plot of power transmission and reflection for the radar beam of FIG. 1 assuming a dielectric constant of the earth of ten showing a high degree of power transmission for beam angles between fifteen and twenty-two degrees.

Referring now to FIGS. 1 and 2, the angle $\phi$ is set to a Brewster angle. A Brewster angle is an angle at which electromagnetic radiation, striking an interface between two materials of difference indices of refraction, will reflect only that portion of the electromagnetic radiation that is perpendicularly polarized. Electromagnetic radiation has perpendicular polarization if the electric vector of the electromagnetic radiation is perpendicular to the incident plane, a plane that includes the axis of propagation of the electromagnetic radiation and the normal to the interface surface.

If the electromagnetic radiation striking the surface has parallel polarization (i.e., the electric vector is parallel to the incident plane) none of the electromagnetic energy will be reflected and all will pass through the interface. The grazing Brewster angle $\phi$ is determined by the relative index of refraction and is equal to 90 degrees minus the arc-tangent of the index of refraction of the entered medium (the earth in this case) divided by the index refraction of the incident medium (air in this case). The index of refraction, in turn, is the square root of the dielectric constant of the medium (the earth in this case).

In the present situation, the dielectric constant of earth normally varies between approximately ten and twenty depending upon soil type, water content and radar frequency. At 0.753 GHz representing the frequency of average wavelength of the radar signal in the preferred embodiment of this invention, the dielectric constant is very close to ten. Accordingly, the Brewster angle will be achieved when $\phi$ equals approximately seventeen degrees.

Referring to FIG. 2, it will be seen under these assumptions that seventeen degrees provides the maximum transmission of radar energy through the surface of the earth and the minimum reflection.

When electromagnetic radiation is incident to the surface of the earth at the Brewster angle, angle $\rho$ will also be approximately seventeen degrees from vertical.

Referring now to FIG. 1, the antenna head 16 moves the receiving antenna 22 and transmitting antenna 20 in tandem to be substantially aligned along the air path 24 at the Brewster angle at all times. As will be understood in the art, however, the antennas 20 and 22 while having greatest sensitivity and transmission efficiency along the air path 24 also accepting and transmit radiation at other angles dictated by the shapes and size of their primary lobes. Generally the antennas 20 and 22 will provide coverage of a substantial portion of the scanning area 26 at each position in the raster pattern 42.

Figure 3:
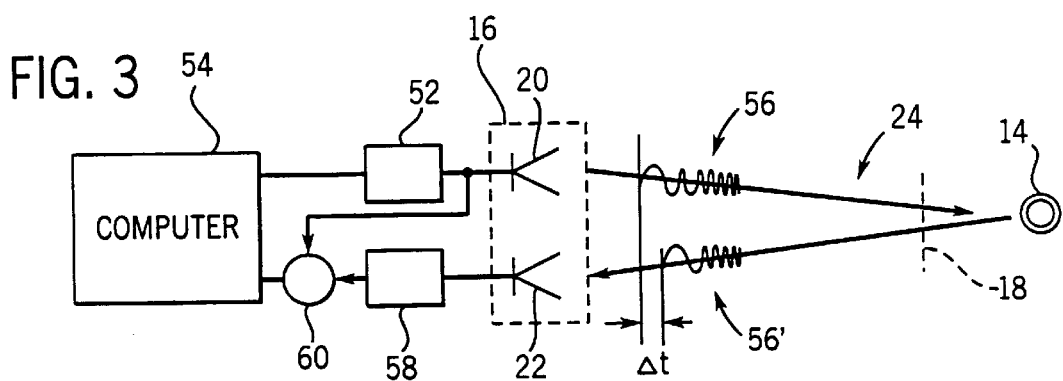
FIG. 3 is a schematic block diagram of the radar system of FIG. 1 showing the antenna head together with its associated radar processing electronics including a computer executing a stored program.

Referring now to FIG. 3, transmitting antenna 20 is connected to transmitter circuitry 52 providing a controlled sine wave output between 620 and 960 MHz according to a command provided by computer 54. Accordingly, transmitting antenna 20 produces a frequency modulated radar signal 56 beginning at a low frequency and culminating at a high frequency. The center frequency is selected to reduce the effect of roughness in the surface of the earth 18 at the scanning area 26.

The signal 56 emitted by transmitting antenna 20 propagates along air path 24 through the surface of the earth 18 to reflect off buried structure 14 and to return attenuated and shifted in time as signal 56'. The received signal 56' is collected by receiving antenna 22 and provided to receiver circuitry 58 and then to one input of a mixer 60. A second input of the mixer 60 receives the originally transmitted signal 56.

As a result of the relative time shift between signals 56 and 56', signal 56' will be lower in frequency than signal 56 at any given time as a function of the time delay caused by the effective path length between the antenna head 16 and the buried structure 14. Accordingly, the mixer 60 outputs a product of these signals 56 and 56' containing sum and difference frequencies. The sum frequencies are filtered out by conventional techniques and the resulting signal 66 is provided to the computer 54 to be captured as a set of sampled and digitized values associated with a particular antenna raster position. The computer includes an A/D converter sampling at approximately eighty-eight kilohertz to obtain 512 samples at each antenna raster position. The A/D converter is a sixteen-bit converter.

As will be understood from this description, the signal captured by the computer 54 will contain a mixture of frequency components, one for each reflecting point of the buried structure 14. In fact, the mixture of frequencies will represent scattering from objects everywhere above and below the earth that are within the beam width of the antennas 20 and 24. Accordingly, a Fourier transform or spectrum analysis of this signal will produce peaks representing reflections at different distances from the antenna head 16 in much the same manner as if a short pulse were transmitted and echoes were received and measured.

Figure 6:
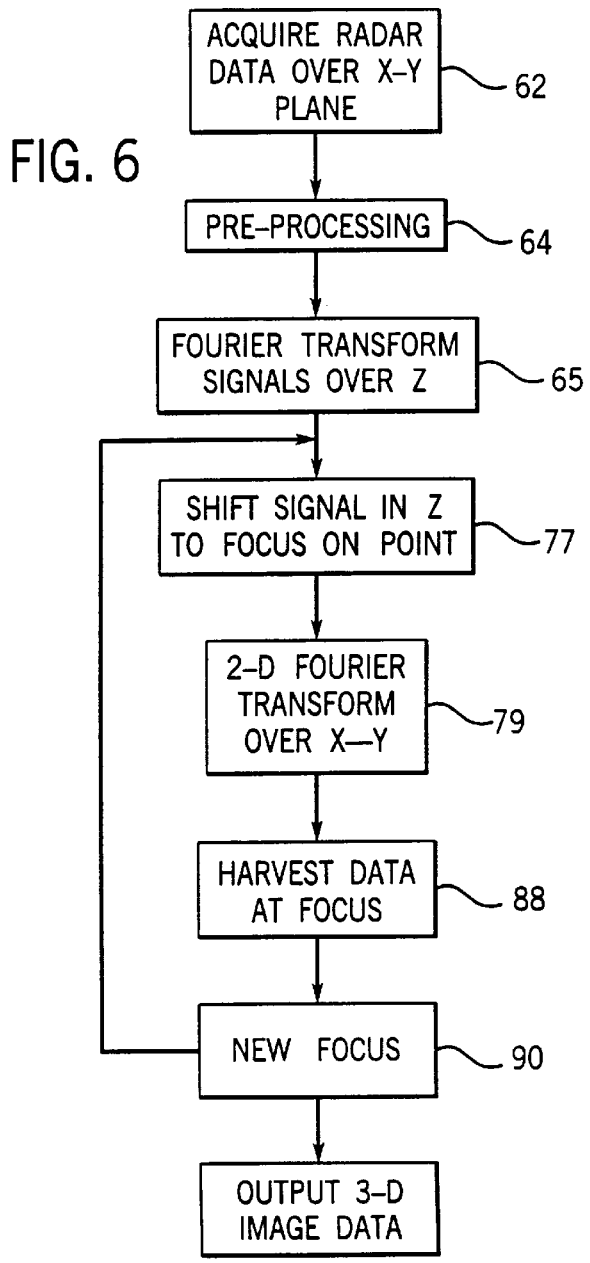
FIG. 6 is a flow chart showing the steps performed by the computer of FIG. 3 in performing the data collection and data processing steps of FIG. 4.

Referring then to FIG. 6 at a first step of an acquisition of information about a sub-surface volume 12 indicated by process block 62, radar signal 66 is acquired at regular points over the scanning area 26. In acquiring this data, the antenna head 16 will move in the raster pattern 42 taking thirty-two measurements at spaced points along the x'-axis for thirty-two vertical increments along the y'-axis as the boom 38 is raised. The acquisition process thus acquires 1,024 separate signals 56' each 512 points long.

Figure 4:
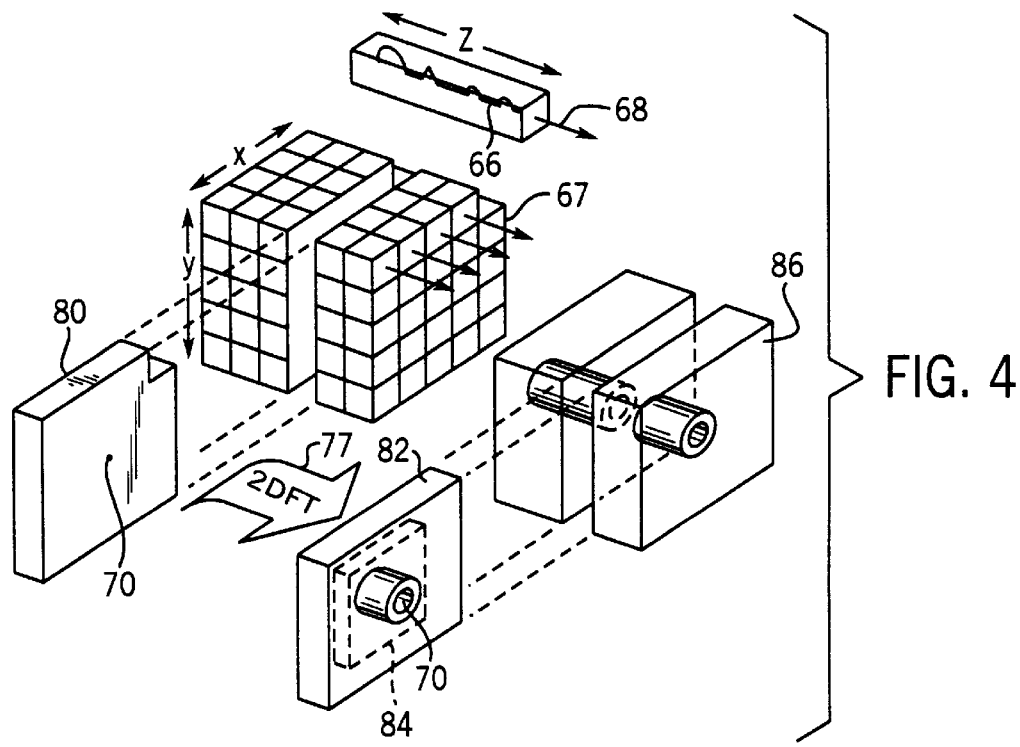
FIG. 4 is a graphic representation of the data collection and data processing steps used to produce a three dimensional image of the sub-surface volume of FIG. 1 from data collected from the antenna head.

Referring to FIGS. 1 and 4, each signal 66 is stored as a set of 512 sampled and digitized points by the computer 54 and may be assembled into a data matrix 67 within computer 54 where x and y dimensions of the data matrix 67 correspond to particular antenna raster positions at which the signal 56' was acquired. The z-axis of the data matrix 67 describes a particular sampled point within the signals 56 and more generally a depth of a reflection indicated by the signal 66.

At process block 64, after the matrix of data has been obtained, it is preprocessed as indicated by process block 64. First a Fourier transform is executed on the signals 66 to produce echo data 66' shown in FIG. 4 in which amplitude indicates the strength of echoes and the horizontal axis represents the time delay of those echoes. A fixed delay period is subtracted from this echo data 66' by truncating the earliest sampled points which correspond to intrinsic delays of the system electronics. The data 66' is then inverse Fourier transformed to return it to its original frequency domain state and the echo data 66 is then normalized to account for drift in the sensitivities of the transmitter circuitry 52 and receiver circuitry 58. This normalization is based on a monitoring of direct coupling between antennas 20 and 22 to determine changes in the components' sensitivities that are unrelated to the transmission air path 24. The antennas 20 and 22 have a minus eighty dB antenna coupling.

At process block 77, the data 66 is again Fourier transformed and then while in the frequency domain, shifted 68 along the time axis, a different amount for each z-row of the data matrix 67. The shifting changes the apparent delay in receiving the echo signal. The data is then Fourier transformed back into the time domain.

Figure 5:
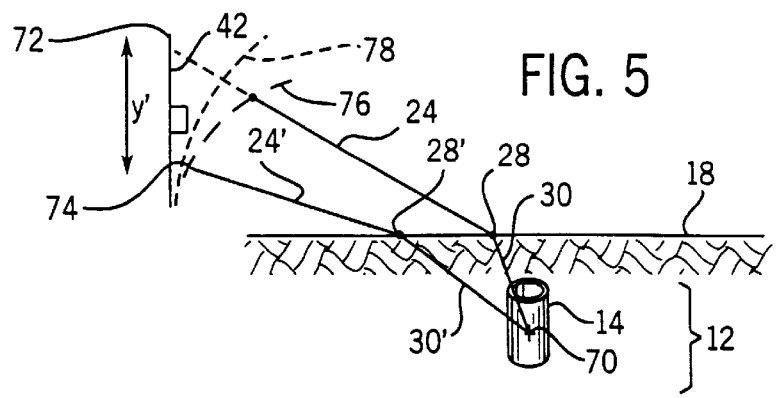
FIG. 5 is a schematic representation of a cross section through the investigation site of FIG. 1 showing the path of reflected radar energy as refracted by the earth/air interface and the effect on such refraction in focusing the synthetic aperture of the present invention.

Referring also to FIG. 5, the shifting modifies the data 66 to appear as if it had been acquired over a curved raster 76. The desired raster curvature is one in which echoes from a single focus point 70 are received simultaneously at all points on the curved raster 76 while echoes from other points removed from the focus point 70 would be out of phase and thus cancel or add destructively. Such synthetic aperture radar (SAR) techniques are known generally in the radar art.

Normally SAR techniques shift the data 66 of the data matrix 67 to simulate a raster following a section of the surface of a sphere or an approximation thereof. This shape places all points on the receiving surface an equal distance and time delay from a focus point in a homogeneous medium. In the oblique imaging system of the present invention however, this assumption must be modified because of the refractive properties of the earth/air interface.

Referring still to FIG. 5, the amount of shifting 68 of the signals 66 is calculated by considering the propagation delay along the air paths 24 and 24' and earth paths 30 and 30' for different points in the raster pattern 42. The shifting of data 66 is performed so that the delay over the combined air path 24 (or 24') and earth path 30 (or 30') between a focus point 70 and all points in the raster pattern 42 will be equalized. For example, for a location of the antenna head 16 on the raster pattern 42 near its top in the y'-axis (designated high point 72) and for a location of the antenna head 16 on the raster pattern 42 near its bottom (low point 74), refractive effects will cause different amounts of bending of the combined air path and earth paths. This plus the variation in propagation speed between air and earth will require a curvature of the raster 76 to a shape that differs substantially from a spherical section surface 78 (equidistant from point 70) as could be used in an air-only scanning.

The generation of curved raster 76 and the necessary time shifting 68 may be deduced by calculating the air and earth paths for each point on the raster 42 using Snell's law, and computing the total delay based on the propagation speeds through earth and air, and shifting the data to equalize the total delay.

The shifting of the signals 66 to focus the synthetic aperture on a particular focus point 70 is shown by process block 79 of FIG. 6.

Referring again to FIG. 4, once the shifting is complete, a set of x-y plane slices 80 of the data matrix 67 holding the echo data from the focus point 70 are transformed by the two-dimensional Fourier transform along the x and y axes. The transformation integrates the various data collected at different antenna raster positions into an image of focus point 70 to provide a synthetic aperture of an antenna comparable to the size of the entire raster pattern 42.

The result of the transformation is a set of slice images 82. A small volume 84 about the focus point 70 will also be acceptably in focus. At process block 88 of FIG. 6, points within the volume 84 are harvested (at different x, y and z values) and placed in an image matrix 86 corresponding in size to data matrix 67 but providing image data.

This image matrix 86 may be further transformed geometrically to accommodate the fact that the earth path 30 is not vertically through the surface of the earth but canted at the refraction angle from vertical. The z-axis may also be compressed reflecting the slower propagation velocity of electromagnetic waves through the earth.

At process block 90, a new focus point 70 is established outside the volume 84 and the processes of process block 77, 79, 88 and 90 are repeated until an entire image is developed in image matrix 86.

The data of the image matrix 86 may be printed on a slice basis or may be presented in perspective version to the user for the identification of underground materials, objects or pollutants.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A ground penetrating radar providing images of beneath a surface of the earth comprising:

a radar transmitter providing a microwave electrical signal;

a radar antenna receiving the electrical signal from the radar transmitter to produce a transmitted radar signal, the radar antenna having a primary transmission axis along a direction of greatest power of the radar signal;

an antenna head supporting the radar antenna with respect to the surface of the earth so that the radar antenna's primary transmission axis intersects the surface of the earth at substantially a Brewster angle being a function of the dielectric constant of the earth;

a radar receiver receiving reflected radar signals from the radar antenna; and an electronic computer processing the received radar signals to output an indication of the materials beneath the surface of the earth;

wherein the radar signals indicate time delays in echoes from material beneath the surface of the earth; and wherein the computer operates according to a stored program to shift the radar signals with respect to each other to simulate the reception of radar signals over a curved surface focused on the points beneath the surface of the earth;

wherein the computer operates to simulate reception of the radar signals over a curved surface where radar signals take equal time to travel from a given point beneath the surface of the earth to all points on the curved surface.

2. The ground penetrating radar of claim 1 wherein the Brewster angle is an earth grazing angle of from ten to thirty-five degrees.

3. The ground penetrating radar of claim 1 wherein the radar antenna imparts a parallel polarization to the radar signal.

4. The ground penetrating radar of claim 1 wherein the scanning assembly includes a raster carriage moving the antenna head to a plurality of points in a surface extending across the primary transmission axis.

5. The ground penetrating radar of claim 4 wherein the surface is a plane.

6. The ground penetrating radar of claim 1 wherein the computer executes a stored program to produce a three-dimensional representation of material beneath the surface of the earth.

7. The ground penetrating radar of claim 1 wherein the radar signals indicate time delays in echoes from materials beneath the surface of the earth and wherein the computer operates a stored program to:

(i) collect the radar signals from different x and y positions in the plane, where x and y are perpendicular Cartesian coordinates, to produce a three-dimensional matrix of data where a temporality of the radar signal forms a z dimension of the matrix and x and y dimensions of the matrix correspond to the x and y positions at which the radar signals were acquired;

(ii) perform a two-dimensional Fourier transform across the x and y dimensions of the matrix to produce an image of a plane beneath the surface of the earth.

8. The ground penetrating radar of claim 1 wherein the radar antenna includes a separate receiving and transmitting antenna structure.

* * * * *